United States Patent
Vissicaro

(10) Patent No.: US 10,949,695 B1
(45) Date of Patent: Mar. 16, 2021

(54) IMAGE UNIT CONVERTER SYSTEM

(71) Applicant: Vito Vissicaro, Tempe, AZ (US)

(72) Inventor: Vito Vissicaro, Tempe, AZ (US)

(*) Notice: Subject to any disclaimer, the term of this patent is extended or adjusted under 35 U.S.C. 154(b) by 87 days.

(21) Appl. No.: 16/196,797

(22) Filed: Nov. 20, 2018

Related U.S. Application Data

(60) Provisional application No. 62/588,848, filed on Nov. 20, 2017.

(51) Int. Cl.
  *G06K 9/00* (2006.01)
  *G06K 9/18* (2006.01)
  *G06F 1/16* (2006.01)
  *G06K 9/54* (2006.01)

(52) U.S. Cl.
  CPC .......... *G06K 9/18* (2013.01); *G06F 1/1686* (2013.01); *G06K 9/54* (2013.01)

(58) Field of Classification Search
  CPC .......... G06K 9/18; G06K 9/54; G06F 1/1686
  USPC ........................................... 382/182
  See application file for complete search history.

(56) References Cited

U.S. PATENT DOCUMENTS

| | | | | |
|---|---|---|---|---|
| 8,605,119 | B1* | 12/2013 | Bankhead | G09G 5/00 345/660 |
| 9,734,634 | B1* | 8/2017 | Mott | G06T 19/006 |
| 2010/0169397 | A1* | 7/2010 | Choi | G06F 3/04886 708/206 |
| 2014/0218409 | A1* | 8/2014 | Kawatani | G06T 11/00 345/670 |
| 2016/0363990 | A1* | 12/2016 | Key | G01B 11/02 |
| 2017/0263128 | A1* | 9/2017 | Chandran | G06T 7/50 |

* cited by examiner

*Primary Examiner* — Stephen P Coleman
(74) *Attorney, Agent, or Firm* — Schmeiser, Olsen & Watts LLP

(57) ABSTRACT

An image unit converter system is provided. The system may include a user computing device comprising a memory storing conversion factor data. The user computing device is programmed to receive from a camera coupled to the user computing device an image of a drawing or list with original dimension units applied to the drawing or list that is viewable by a camera coupled to the computing device. The user computing device may also be programmed to automatically process the signal received from the camera and retrieve conversion factor data. Further, the user computing system may also be programmed to, using the conversion factor data retrieved, automatically convert all dimensions in the drawing or list according to a user defined unit conversion factor and display on the user computing device the drawing or list with converted units replacing the original dimension units in real time.

10 Claims, 3 Drawing Sheets

IMAGE UNIT CONVERTER SYSTEM

CROSS REFERENCE TO RELATED APPLICATION[S]

This application claims priority to U.S. Provisional Patent Application to Vito Vissicaro entitled "Image Unit Converter System," Ser. No. 62/588,848, filed Nov. 20, 2018, the disclosure of which is hereby incorporated entirely herein by reference.

BACKGROUND OF THE INVENTION

Technical Field

This invention relates generally to a unit conversion system and more particularly to a system for converting units in a drawing or list automatically utilizing a camera of a computing device.

State of the Art

The use of computing devices for technical drawings is commonplace. However, often times, printed drawings or lists are provided and there are instances when engineers, architects, and the like, are required to convert units shown on the drawings or lists from one unit type to another, such as, but not limited to, English units to metric units and the like. Typically, in order to do so, the person is required to apply a conversion factor to each measurement in the drawing and manually record results on the drawing or other type of document for reference. This is not only time-consuming and inefficient, with many opportunities for error, but is impossible to perform in real time.

Accordingly, there is a need for an image unit converter system that allows a user to utilize a computing device having a camera to capture and then convert all units viewable by the camera virtually simultaneously for real time feedback display.

DISCLOSURE OF THE INVENTION

The present invention relates to an image unit converter system for converting units in a drawing or list automatically utilizing a camera of a computing device for real time display.

An embodiment includes an image unit converter system comprising a computer server having a memory storing conversion factor data and a user computing device coupled to the computer server. The computer server may further comprise an optical character recognition (OCR) module stored on the memory. The computer server may be programmed to receive from the user computing device a signal including an image of a drawing or list with original dimension units applied to the drawing or list that is viewable by a camera coupled to the computing device. The computer server may then automatically process the signal received from the user computing device and utilize the OCR module to recognize printed or written text characters of original dimension units within the signal. Then, using the conversion factor data retrieved from the memory, the computer server may automatically convert all dimensions in the drawing or list according to a user-defined unit conversion factor and transmit for display, on the user computing device, the drawing or list with converted units replacing the original dimension units. The user may thereby view the drawing or list, having converted units, in real time.

Another embodiment includes an image unit converter system comprising a user computing device having a memory storing conversion factor data and an OCR module. The user computing device may be programmed to receive from a camera coupled to the user computing device an image of a drawing or list with original dimension units applied to the drawing or list that is viewable by a camera coupled to the computing device. The user computing device may then automatically process the signal received from the camera and utilize the OCR module to recognize printed or written text characters of original dimension units within the signal. Then, using the conversion factor data retrieved from the memory, the user computing device may automatically convert all dimensions in the drawing or list according to a user-defined unit conversion factor and display, on the user computing device, the drawing or list with converted units replacing the original dimension units. The user may thereby view the drawing or list, having converted units, in real time.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an image unit converter system for converting units in a drawing automatically utilizing a camera of a computing device for real time display.

Figure 1:
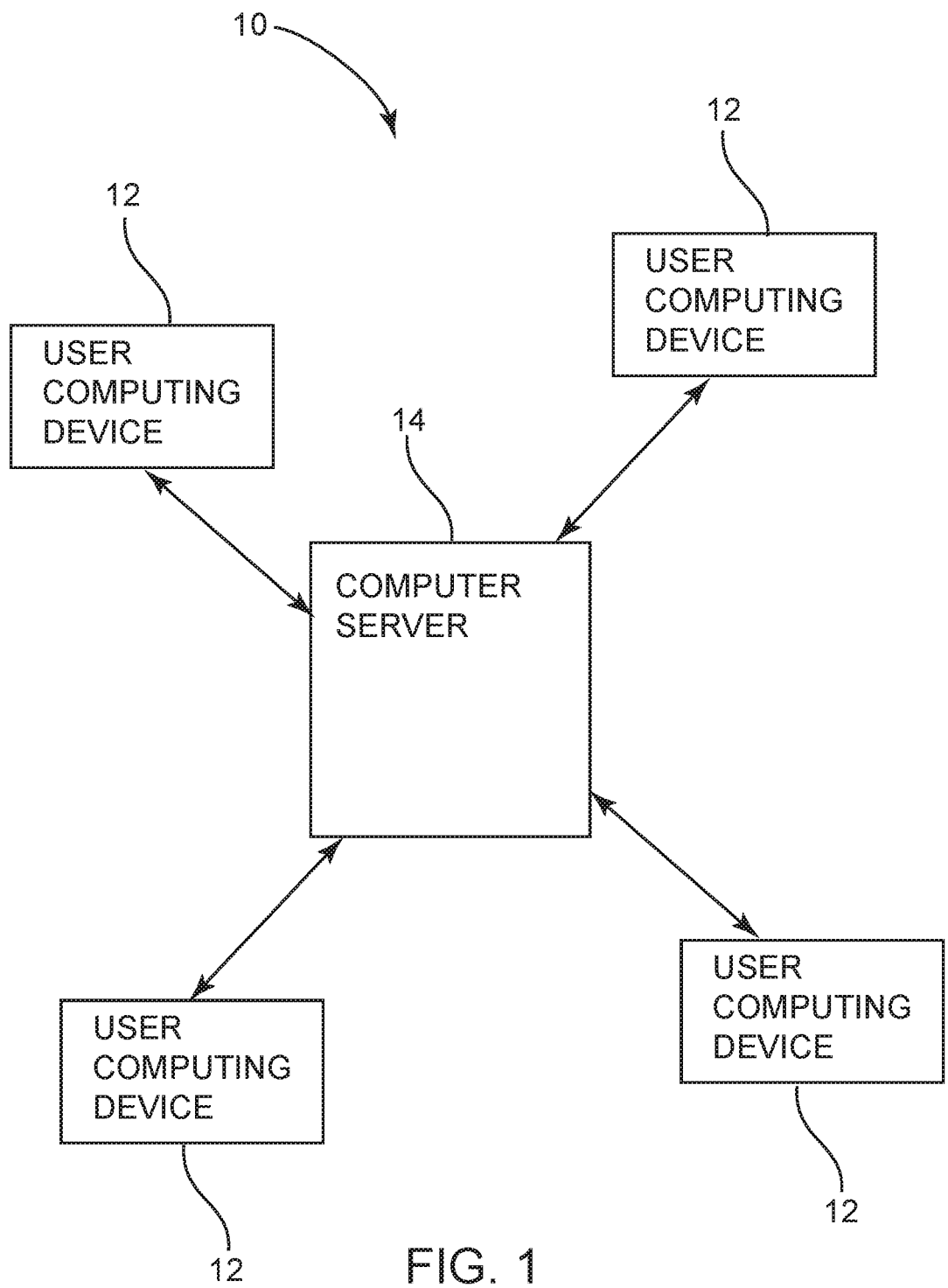
FIG. 1 is a diagrammatic view of an image unit converter system in accordance with an embodiment.

Referring to the drawings, FIG. 1 depicts an embodiment of an image unit converter system 10. The system 10 may include user computing devices 12 and a computer server 14, wherein the user computing device 12 are coupled to the computer server 14. This coupling may be a network connection, such as through an Internet connection, wherein the user computing devices 12 may communicate with and receive communication from the server 14. The computer server 14 may include a memory storing conversion factor data and an optical character recognition (OCR) module.

Figure 2:
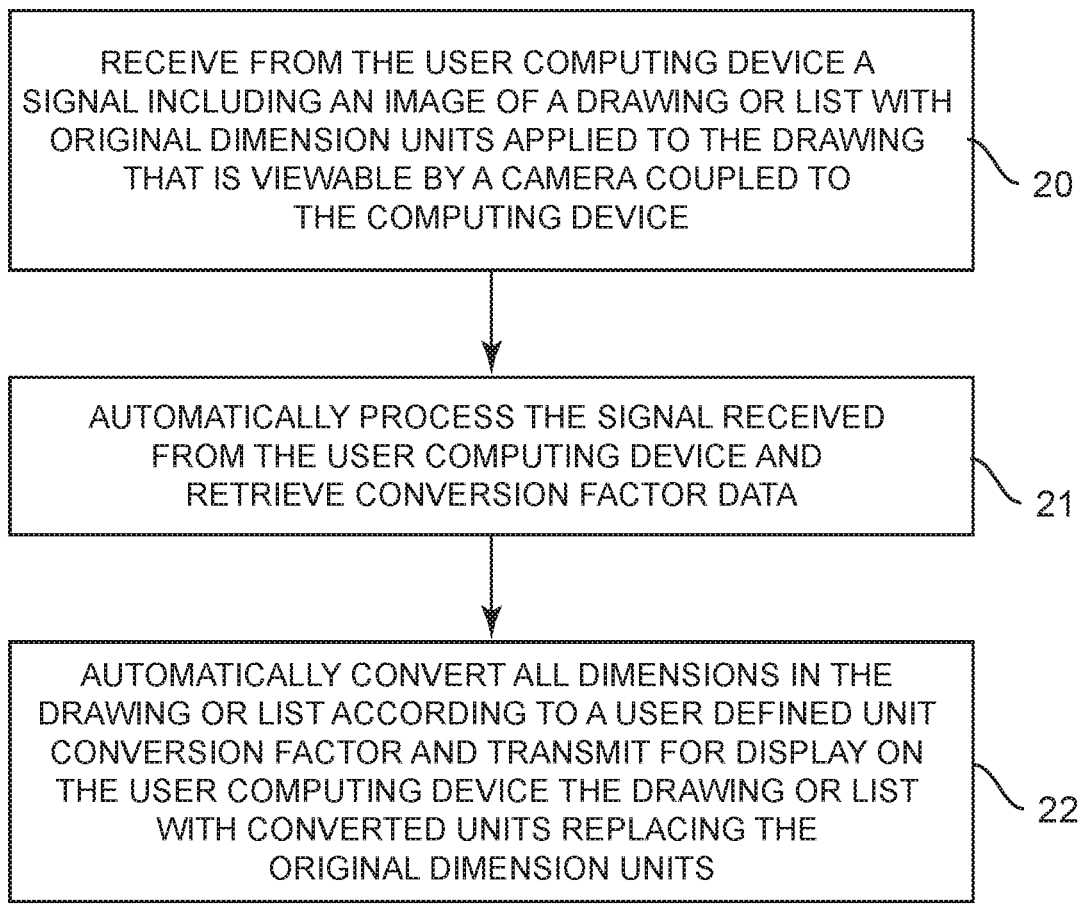
FIG. 2 is a flow chart of programmed steps of a computing device of an image unit converter system in accordance with an embodiment.

The user computing device 12 may be coupled to the computer server 14, and, referring to FIG. 2, the computer server 14 may be programmed to receive from the user computing device a signal including an image of a drawing or list with original dimension units applied to the drawing or list that is viewable by a camera coupled to the computing device (Step 20); automatically process the signal received from the user computing device and retrieve conversion factor data (Step 21); and using the conversion factor data retrieved, automatically convert all dimensions in the drawing or list according to a user defined unit conversion factor and transmit for display on the user computing device the drawing or list with converted units replacing the original dimension units (Step 22).

In embodiments, the computer server may automatically process the signal received from the user computing device and utilize the OCR module to recognize printed or written text characters of original dimension units within the signal in order to convert the dimension units using the conversion factor data. In some embodiments, the OCR module may operate to determine the dimensions within the image received by the computer server and store the same within the memory of the server 14. The recognized dimensions may then be converted wherein the server is programmed to convert the dimension to the desired or selected dimension utilizing the unit conversion factor stored in memory of the server.

In some embodiments, the system 10 may be simply a user computing device 12 that performs all operations. In these embodiments, the user computing device 12 may be programmed to receive from a camera coupled to the user computing device an image of a drawing or list with original dimension units applied to the drawing or list that is viewable by a camera coupled to the computing device; automatically process the signal received from the camera and retrieve conversion factor data; and using the conversion factor data retrieved, automatically convert all dimensions in the drawing or list according to a user defined unit conversion factor and display on the user computing device the drawing or list with converted units replacing the original dimension units.

Figure 3:
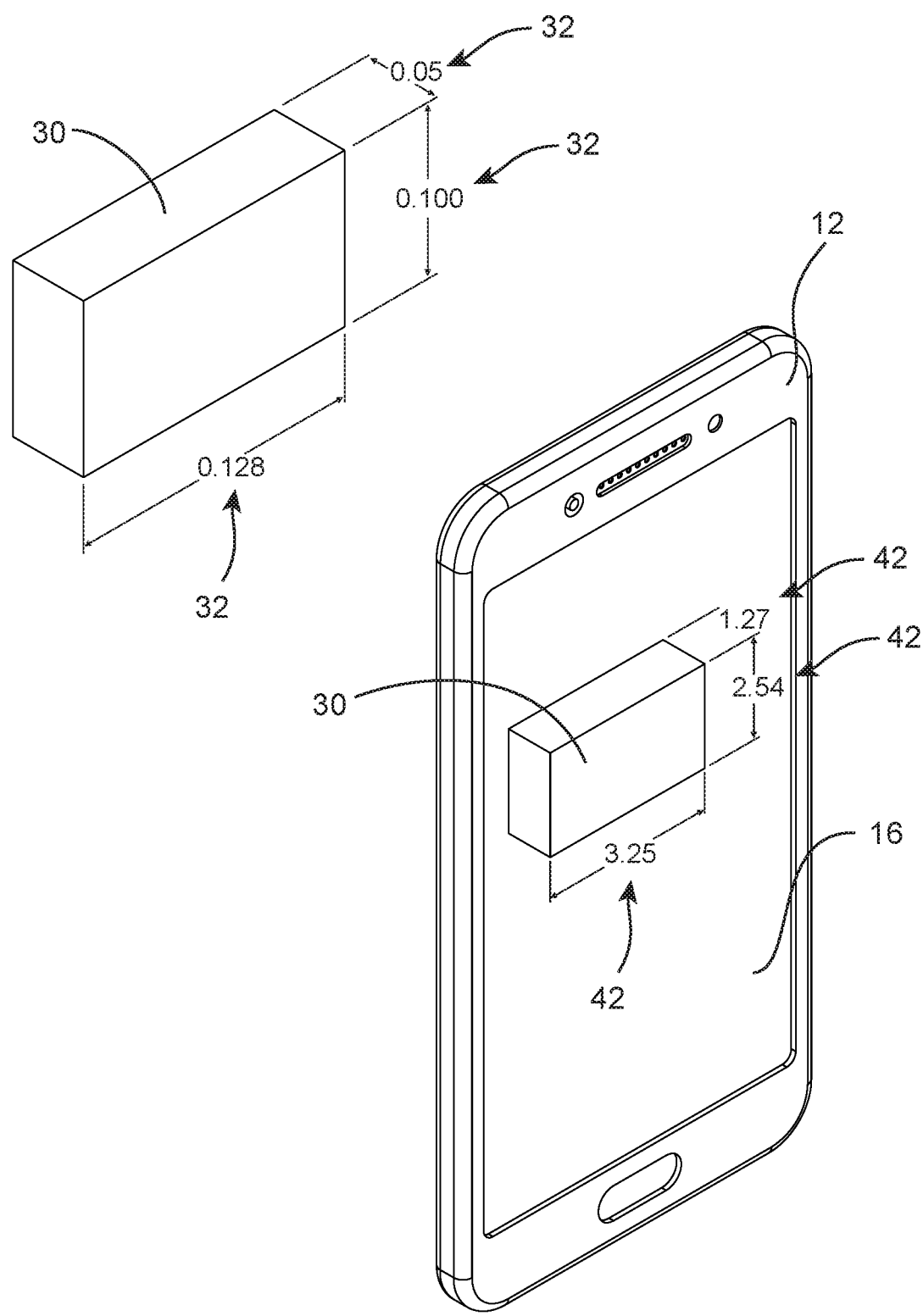
FIG. 3 is a view of a computing device operating an image unit converter system according to an embodiment.

The user computing device may include, without limitation, a smartphone with a camera, a tablet with a camera or a computer with an attached camera. Each of these computing devices 12 may be utilized to operate the system 10. To better explain the operation of the system 10, referring to FIG. 3 as an example and not a limitation, the user computing device 12 may be a smartphone. The system 10 may provide the program to the computing device 12 in the form of a mobile app. Therein the user will select the unit conversion to be performed on the app menu using the user computing device 12. The user may use a camera coupled to the user computing device 12 to aim at the target or drawing 30 containing single or multiple measurements 32. The user computing device 12 will display on screen 16 the drawing 30 with converted units 42 converted to the desired measurement system in real time. The user computing device may then be operated to take a snapshot of the screen with the drawing 30 having converted units 42. Further still, in some embodiments, the system 10 may include the server 14 further programmed to automatically generate an image of the drawing with the converted units and send the same to the user computing device 12 in response to receiving a signal from the user computing device 12 for a converted drawing. For example, the system may convert the measurements 32 from metric to US customary or US customary to metric.

The system 10 may include conversion factors for units including, but not limited to miles, miles (nautical), yard, foot, inch, kilometer, meter, centimeter, millimeter and the like. The user may also input any custom conversion factor to suit his or her needs, such as doubling dimensions using a factor of 2. The system 10 may detect the units showing on screen or viewable by the camera regardless of orientation. This is especially useful when, for example, converting units of a mechanical or architectural drafting, schematics or any printed media.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An image unit converter system comprising:
   a computer server comprising a memory storing conversion factor data; and
   a user computing device coupled to the computer server, the computer server programmed to:
      receive from the user computing device a signal including an image comprising a drawing and original dimension units applied to the drawing and a desired unit conversion to be performed that is viewable by a camera coupled to the computing device;
      automatically process the signal received from the user computing device and retrieve conversion factor data; and
      using the conversion factor data retrieved, automatically convert all dimensions in the drawing according to the desired unit conversion and transmit for display on the user computing device the drawing with converted units replacing the original dimension units, wherein the drawing is unconverted.

2. The system of claim 1, wherein a plurality of converted units is displayed simultaneously on the user computing device in real time.

3. The system of claim 1, wherein the computer server is further programmed to automatically generate an image of the drawing with the converted units and send said image to the user computing device in response to receiving a signal from the user computing device for a converted drawing.

4. The system of claim 1, wherein the computer server further comprises an optical character recognition module.

5. The system of claim 4, wherein the computer server is further programmed to utilize the optical character recognition module to recognize the original dimension units.

6. An image unit converter system comprising:
   a user computing device comprising a memory storing conversion factor data, the user computing device programmed to:
      receive from a camera coupled to the user computing device an image comprising a drawing or list and original dimension units applied to the drawing or list and a desired unit conversion to be performed that is viewable by a camera coupled to the computing device;
      automatically process the signal received from the camera and retrieve conversion factor data; and
      using the conversion factor data retrieved, automatically convert all dimensions in the drawing or list according to the desired unit conversion and display on the user computing device the drawing or list with converted units replacing the original dimension units, wherein the drawing or the list is unconverted.

7. The system of claim 6, wherein a plurality of converted units is displayed simultaneously on the user computing device in real time.

8. The system of claim 6, wherein the computer server is further programmed to automatically generate an image of the drawing with the converted units and send said image to the user computing device in response to receiving a signal from the user computing device for a converted drawing.

9. The system of claim 6, wherein the user computing device further comprises an optical character recognition module, wherein the user computing device is further programmed to utilize the optical character recognition module to recognize the original dimension units.

10. The system of claim 9, wherein a plurality of converted units is displayed simultaneously on the user computing device in real time.

\* \* \* \* \*